United States Patent [19]
Patriquin et al.

[11] Patent Number: 5,097,439
[45] Date of Patent: Mar. 17, 1992

[54] EXPANSIBLE FIXED DISK DRIVE SUBSYSTEM FOR COMPUTER

[75] Inventors: Edward L. Patriquin; David G. Roe, both of San Jose, Calif.

[73] Assignee: Quantum Corporation, Milpitas, Calif.

[21] Appl. No.: 626,428

[22] Filed: Dec. 14, 1990

Related U.S. Application Data

[63] Continuation of Ser. No. 268,504, Nov. 8, 1989, abandoned.

[51] Int. Cl.⁵ .............................................. G06F 13/20
[52] U.S. Cl. ........................... 395/425; 364/926.93; 364/927.91; 364/927.99; 364/929.2; 364/935.44; 364/935.48; 364/940.3; 364/952.1; 364/968; 364/DIG. 2; 360/98.01; 395/800
[58] Field of Search ............... 364/200, 900, 708; 360/97.01, 98.01, 97.03

[56] References Cited

U.S. PATENT DOCUMENTS

| | | | |
|---|---|---|---|
| 4,164,767 | 8/1979 | Gyi et al. | 360/98.03 |
| 4,183,084 | 1/1980 | Lawson | 364/200 |
| 4,268,906 | 5/1981 | Bourke et al. | 364/200 |
| 4,484,263 | 11/1984 | Olson et al. | 364/200 |
| 4,583,133 | 4/1986 | Shoji et al. | 364/98.01 |
| 4,589,063 | 5/1986 | Shah et al. | 364/200 |
| 4,639,863 | 1/1987 | Harrison et al. | 364/200 |
| 4,720,782 | 1/1988 | Kovalcin | 364/200 |
| 4,747,047 | 5/1988 | Coogan et al. | 364/200 |
| 4,805,090 | 2/1989 | Coogan | 364/200 |
| 4,817,035 | 3/1989 | Timsit | 364/900 |
| 4,849,929 | 7/1989 | Timsit | 364/900 |
| 5,005,089 | 4/1991 | Thanos et al. | 360/77.08 |

Primary Examiner—Gareth D. Shaw
Assistant Examiner—Matthew C. Fagan
Attorney, Agent, or Firm—David B. Harrison

[57] ABSTRACT

An expansible fixed disk drive data storage subsystem enables attachment of multiple bus-level interface fixed disk drives to a host computer at a single us-level interface fixed disk drive input/output logiical address location. The subsystem includes an interface for direct plug-in attachment to the input/output address, data and control buses of the host computer, and an expansible plurality of disk drive clusters operatively connectable to the interface, each cluster including plural disk drive cables wherein each cable provides an electrical connection to at least one bus-level interface fixed disk drive operatively associated with the cluster; a cluster and cable selection circuit for receiving and storing cluster and cable selection values sent by the host cmputer, gated data, address and control/status lines buffers for connecting a selected cable and its disk drive(s) to the input/output buses of the host computer in response to a particular cluster and cable selection value sent by the host computer, and a disk drive interrupt status register which when set by a said disk drive within the cluster and read by the host computer indicates to the host computer that the disk drive has performed some task or requires attention.

8 Claims, 5 Drawing Sheets

EXPANSIBLE FIXED DISK DRIVE SUBSYSTEM FOR COMPUTER

This application is a continuation of application Ser. No. 07/268,504, filed 11/08/88.

FIELD OF THE INVENTION

The present invention relates to non-removable rotating disk media data storage devices (fixed disk drives) for computing systems. More particularly, the present invention relates to apparatus and methods for an expansible fixed disk drive subsystem for a small computer system, such as a personal computer or workstation.

BACKGROUND OF THE INVENTINO

Fixed disk drives have been installed in small computing systems because fixed disk drives, unlike floppy disk drives, offer substantially faster data track access times and significantly greater data storage capacities. One popular small computing system architecture is the IBM Personal Computer AT (tm). This computing architecture, based around the Intel 80286 monolithic microprocessor, has become a standard "open" architecture, meaning that the architecture provides a number of input/output port connectors enabling expansion boards to connect to the data, address and control buses of the computer. Expansion boards typically plug into 1 the computer and thereby expand in some predetermined fashion the functional capability of the overall computing system.

One usually encountered expansion card is a disk drive controller card which interfaces e.g. stepper motor actuated floppy and fixed disk drives to the bus level computer architecture. Typically, up to two floppy disks and up to two fixed disks are supported simultaneously by a single controller card. More drives may be added by addition of additional controller cards, etc. Usually, the computer housing defines wells where the two fixed disk drives and the two floppy drives may be contained and mounted, the floppy drives positioned to provide front panel access to the user. The computer's internal power supply is typically configured to provide pigtail leads and plugs for supplying operating power to the four internal drives.

Computers of this type are typically divided into memory space and input/output (I/O) space or addresses. Typically, certain I/O addresses are dedicated to the fixed 1 disk drive resources. One frequently encountered logical arrangement within the I/O space of the host computer is as follows:

| I/O Address | Function |
| --- | --- |
| 1F0 | Data Byte |
| 1F1 | Error Byte |
| 1F2 | Sector (512 byte) Count Byte |
| 1F3 | Starting Sector Byte |
| 1F4 | Starting Cylinder, low byte |
| 1F5 | Starting Cylinder, high byte |
| 1F6 | Select Drive and Head Byte |
| 1F7 | Status/Command Byte |
| 1F8-15 | Reserved |
| 3F6 | Alternate Status/Command Byte |
| 3F7 | Digital Input Byte |

The disk drive controller card responds to the host at these I/O addresses in order to accomplish fixed disk drive data transfer transactions as may be requested by the host. For example, if the host wishes to read blocks ot data from, or to write blocks of data to the disk drive, the host will write the block count of the transfer at 1F2, the starting sector identifier (within a concentric data track) at 1F3, the starting cylinder logical address at 1F4 and 1F5 and the select drive (one of two drives may be selected) and head at 1F6. A command byte is then written at 1F7 telling the drive to retrieve the data from the disk surface (read) or to obtain the data from the host data bus (write). The disk drive then performs the requested task.

When the task is completed, the disk drive signals that fact by generating an interrupt, thereby indicating to the host that the drive is ready to perform the next task, or transfer the next block of data (if a multi-block transfer is requested). The host then reads the drive status byte location which acknowledges receipt of data read from the disk or which indicates data ready to be transferred via its bus to be written onto the disk. Reading the status byte location 1F7 causes the drive's interrupt to be reset. The drive performs the next task and sets its interrupt line. The host again reads the status byte location, and interrupt driven process continues until all data blocks have been transferred.

The controller card typically translates the starting cylinder number into a physical cylinder location for the selected disk drive and then causes the selected disk drive to move its head structure to the physical location commanded. Usually, but not necessarily, the controller puts out stepping pulses and a step direction signal to the disk drive. The disk drive processes the step pulses to cause its actuator to move the heads to the desired location. The select drive and head byte selects the particular drive and head (data surface) which, with the cylinder location, specifies a particular data track.

Disk drive subsystems have been developed which integrate the disk drive controller electronics with the actuator control. One example is the Xebec OWL disk drive which integrated a SASI controller into a disk drive having an open loop stepper motor based head positioner. The Xebec OWL typically required a host adaptor card which plugged into the host expansion interface slot and a cable leading to the disk drive.

Another example is the fixed disk drive expansion board product pioneered by the assignee of the present invention under the registered brand name HARD-CARD (tm). This fixed disk drive expansion board product is described in U.S. Pat. No. 4,639,863, hereby incorporated by reference. This bus-level interface disk drive product integrated the head and disk assembly and the drive controller electronics and interface onto a single expansion card which plugged directly into the host computer expansion slot.

A further recent example has been the Conner Peripherals interface for the IBM Personal Computer AT (tm). This interface has enabled a simplified host adaptor card to connect up to two fixed disk drives having on-board processing capability for decoding and executing host commands received from the host buses. The adapter card merely buffered the data bus and control/status bus, and decoded the address bus at a single I/O address space originally intended for a fixed disk drive. Each drive included interface registers for storing the byte values originally processed by the controller card. The disk drive microprocessor which directly controls head position was also given the task of processing the data supplied by the host at the interface registers. Only two disk drives were supported with Conner Peripherals interface, and overall connecting cable length was limited to about two feet.

The Small Computer System Interface (SCSI) has gained some widespread acceptance in small computer system architectures. SCSI presently accommodates up to seven adaptors, each of which may be included on a separate disk drive, but requires a significant investment in supporting software.

While there have been proposals in the prior art for arranging small disk drives into a large memory array, there has been no practical implementation enabling fixed disk drive clusters or modules to be added incrementally and used very efficiently, in such numbers and arrangements as may be desired by the user from time to time and without requiring substantial modification of operating software each time that an additional cluster or drive is added to the system.

SUMMARY FO THE INVENTION WITH OBJECTS

One general object of the present invention is to provide a fixed disk drive interface which readily enables open ended expansion by connection of multiple fixed disk drive clusters or modules to provide a mass storage array which may be custom tailored to the user's data storage needs in a manner which overcomes the limitations and the drawbacks of the prior art.

Another more specific object of the present invention is to provide a method and apparatus enabling a selectable one of many available disk drives to be present and simultaneously in use at a single logical input/output address area within a small computer.

A further specific object of the present invention is to provide an expansible disk drive subsystem for a host computer which requires only one subsystem software driver to be available to the host operating system irrespective of the number of actual disk drives included within the subsystem.

A still further specific object of the present invention is to provide an expansible disk drive subsystem for a host computer which enables disk drive resources to be added to the system without need for modifying any of the operating software as disk drive resources are added.

One more specific object of the present system is to provide a cluster disk drive subsystem for a host computer which supersedes a single large capacity fixed disk drive with an expansible cluster array of small, high capacity, high performance, low power disk drives to provide more efficient data storage and handling capability in a multi-tasking or multi-user environment, and more redundancy, fault tolerance, and overall data storage reliability at less cost.

In accordance with the principles of the present invention, an expansible fixed disk drive data storage subsystem enables attachment of multiple clusters of cables each supporting a pair of bus-level interface fixed disk drives to a host computer at a single bus-level interface input/output logical address space. The expansible subsystem comprises an interface circuit for direct connection to the input/output address, data and control buses of the host computer, and an expansible plurality of disk drive clusters operatively connectable to the interface circuit, each said cluster supporting a plurality of cables connecting to bus-level interface fixed disk drives via a plurality of disk drive connection cables. Each cable enables gated electrical connection to at least one of the bus-level interface fixed disk drives operatively associated with the particular cluster. A cluster, cable and drive selection circuit is provided for receiving and storing cluster and cable selection values sent by the host computer. Gated data, address and control/status lines buffers enable selectable connection of a selected cable to the input/output buses of the host computer in response to a particular cluster and cable selection value sent by the host computer A disk drive interrupt status register, when set by any one of the disk drives on a cable within the cluster and when read by the host computer, indicates to the host computer that the one interrupt-setting disk drive requires attention.

In one aspect of the present invention the interface is combined with a first logical cluster in order to provide a plurality of cables and bus-level interface disk drives for installation and use within a cabinet enclosing and containing the host computer.

In another aspect of the present invention at least one of the disk drive clusters comprises a housing for the disk drives associated therewith and contains power supply for supplying power to the associated disk drives.

In a further aspect of the present invention the cluster and cable selection circuit comprises a write-only selection register connected to the data bus of the host computer, an identifier field for providing each disk drive cable with a unique identifier within the subsystem and a comparison circuit for comparing each value written by the host into the selection register with the jumper field to whether a correspondence exists, thereby to operate the gated data, address and control/status lines buffers connecting the cable of the disk drive identified by the correspondence to the input/output data, address and control/status buses of the host computer.

In a still further aspect of the present invention the interface circuit may include a BIOS read only memory containing subsystem driver routines executable by a central processing unit of the host computer in order to operate the inventive expansible disk drive subsystem.

In one more aspect of the present invention the interface circuit includes a random access memory for recording dynamic subsystem configuration values during operation of the expansible cluster disk drive subsystem.

In a still further aspect of the present invention one or more disk drive clusters may be operatively connected to the interface means via a cable wherein each of the signal lines of the cable is physically directly associated with at least one ground line.

The method of the present invention enables connecting bus-level interface disk drive clusters to a single logical space of a host computer and includes the steps of:

establishing electrical data, address and control/status bus connections between the input/output data, address and control/status buses of the host computer and each cluster connected to the host computer, providing each drive cable of each cluster with a predetermined unique identifier, recording in a selection register of each cluster connected to the host computer a cluster and cable identifier for the drive selected for a data read or write transaction by the host computer, comparing at each cluster the cable identifier recorded in the selection register thereof with the predetermined unique identifier to identify the drive cluster selected by the host, thereupon comparing at an identified cluster the cable identifier to identify the drive cable within the identified cluster which has been selected by the host, and thereupon, for the duration of the transaction, establishing and maintaining a connection between a drive of the selected cable and the host input/output data, address and control/status buses in response to the identification made at the comparison step.

In one aspect the method of the present invention includes the further steps of:

directly connecting each drive of the clusters to a cluster interrupt status register so that a said drive may set a value in the register to request attention of the host computer, setting a common interrupt line thereby to indicate to the host that the subsystem requires attention from the host computer, thereupon reading by the host computer of the interrupt status registers of the connected clusters of disk drives to ascertain which disk drive has requested attention from the host.

In another aspect the method of the present invention includes the further steps of:

initially scanning all of the disk drive clusters connected to the host computer to ascertain the logical location and storage capacity of each disk drive of each cluster, and recording this information in a resources table in read/write memory, and automatioally making the recorded information recorded in the resources table available to the host computer, so that disk drives may be added and removed without need by the user to modify the host computer operating system.

These and other objects, advantages, aspects and features of the present invention will be more fully understood and appreciated upon consideration of the following detailed description of a preferred embodiment, presented in conjunction with the accompanying drawing.

DETAILED DESCRIPTION OF PREFERRED EMBODIMENT

Figure 1:
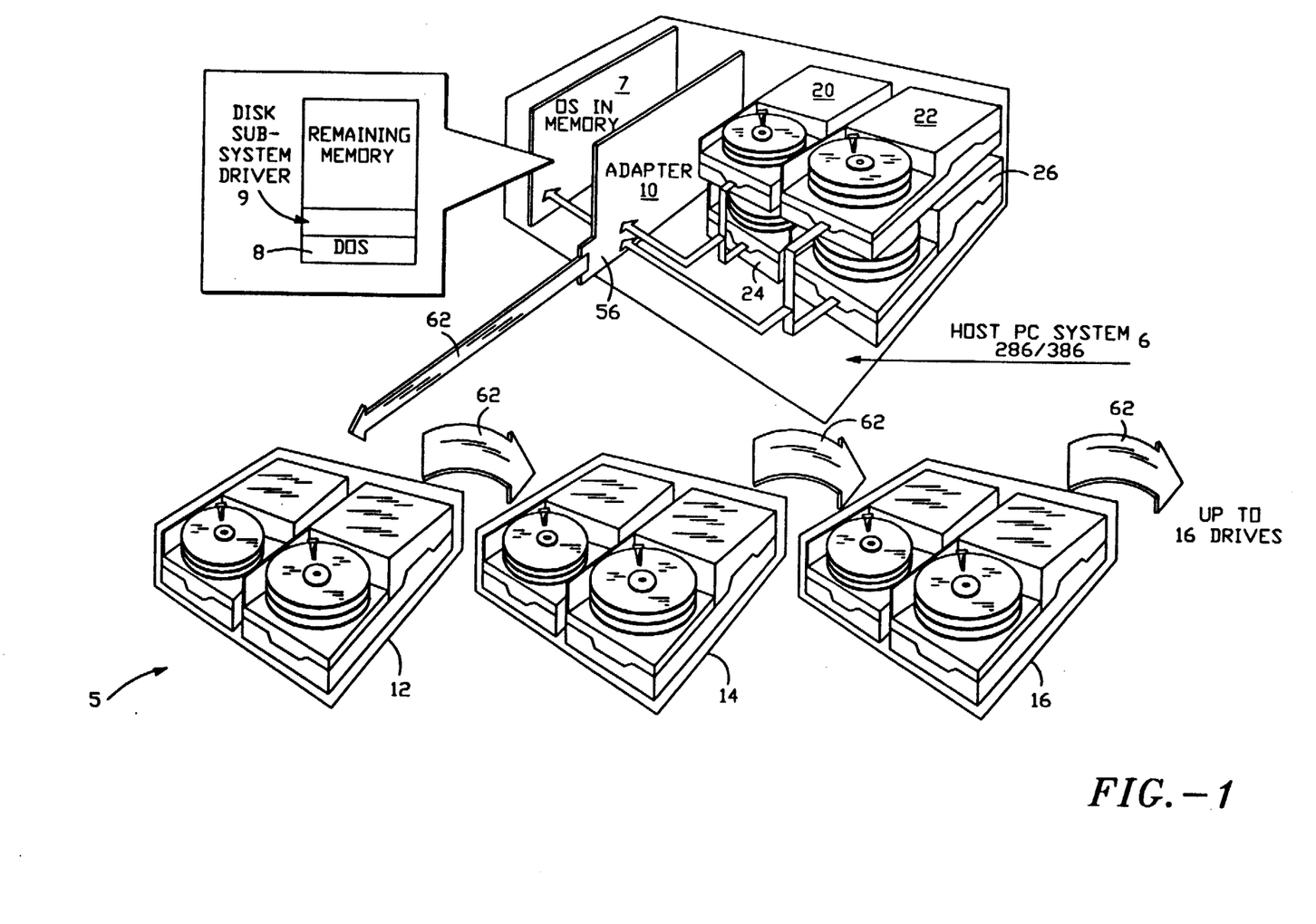
FIG. 1 is a diagrammatic view of a cluster disk drive included with a host computing system in accordance with the principles of the present invention.

FIG. 1 illustrates an expansible fixed disk drive subsystem 5 included within a host computing system 6 including a main memory 7. The subsystem 5 theoretically may support over one hundred thirty thousand on-line fixed disk drives in accordance with the principles of the present invention. A practical number of on-line fixed disk drives is thirty two, although fewer or more disk drives may easily be included within the disk drive subsystem 5.

The host computer 6 has an operating system 8 stored in its main memory 7, along with one or more applications programs, such as database management, spread sheet, word processing and electronic (E) mail, and computer aided design. A small single increment 9, of main memory is devoted to a single subsystem device driver which operates the disk drive subsystem 5.

Figure 2:
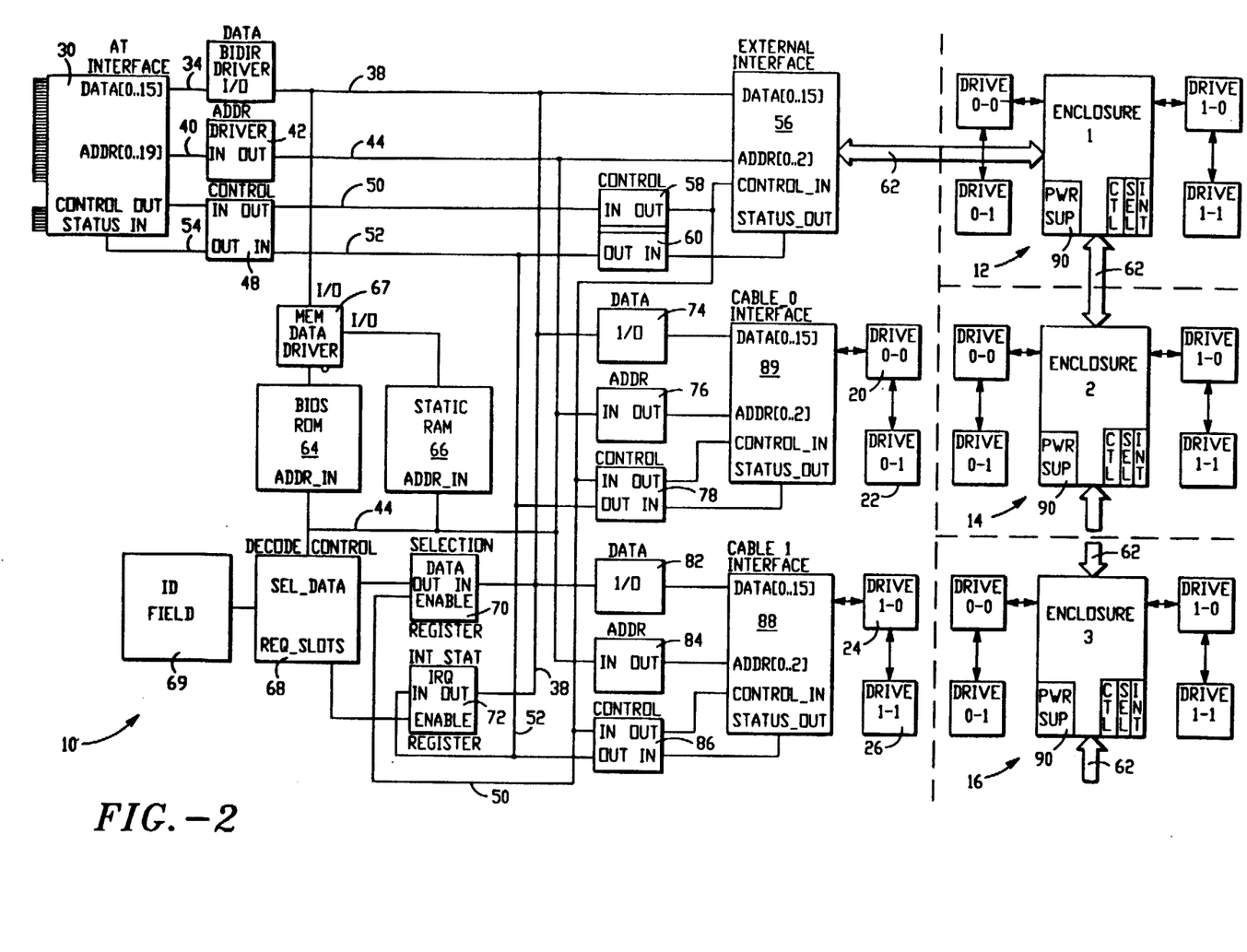
FIG. 2 is an electrical block diagram of the FIG. 1 expansible fixed disk drive interface in accordance with the principles of the present invention.

As shown in FIGS. 1 and 2, an interface unit adaptor card 10 connects directly e.g. by plug-in attachment, to address, data and control bus lines of the host computer 6. The interface unit 1includes a disk drive cluster having two cables 80 and 88 each connecting respectively to four fixed disk drives 20, 22, 24 and 26 which are mounted within the cabinet of the host computer 6. The card 10 also provides an external cable connection interface 56 to as many as seven external disk drive clusters, each containing up to sixteen disk drives. The three external clusters 12, 14 and 16 shown in FIG. 1 are essentially identical and are daisy chained together in order to form an integrated fixed disk drive subsystem. Each cluster, including the cluster of the interface unit 10, is viewed as a separate logical cluster for identification purposes, irrespective of its physical arrangement or connection. Thus, one, two or even three or more clusters may be contained physically within a single physical enclosure providing suitable power supply, ventilation and mounting locations for each disk drive of the cluster.s The interface unit 10 draws its mechanical support and power requirements direclty from the host computer; and, the disk drives attached to the interface unit 10 are typically mounted within the host computer enclosure and are powere dby the host computer supply. On the other hand, each of the external clusters 12, 14, 16, etc., is fully self contained within its own cabinet and has its own internal power supply 90 for powering the disk drives connected therein. While three clusters 12, 14 and 16, each capable of supporting up to sixteen fixed disk drives, are shown in FIG. 1, a break is shown in FIG. 2 in the cable 62 between the enclosures 14 and 16, thereby signifying that more than three clusters are readily included by the user by cables 62 connected in daisy chain arrangement, in order to expand the mass storage capability of the host computer as may be required or desired by the user.

The interface 10 is preferably formed as a plug-in functional expansion card for direc tplug-in connection to the motherboard within the cabinet of the host computer, such as an IBM Personal Computer AT (tm). While this computer is the presently preferred host computer environment, other host computer architectures and environments may be expanded and improved by inclusion of an expansible fixed disk drive interface of the present invention, and the reference to this particular host computer environment is by way of example only, and should not be construed as limiting the scope of the present invention.

In the event that the host computer already includes a floppy/fixed disk controller card, or a fixed disk controller card, and it is intended to be kept in service, it may be necessary to move the input/output address space for the interface unit 10 to some available location other than 1FO–1FF. Two other input locations are supported by switch or jumper selection at the interface unit 10: 170–17F and 320–32 F.

The interface unit 10, which is logically defined as cluster zero, supports e.g. two cables and four bus-level interface fixed disk drives 20, 22, 24 and 26 which may be mounted internally within the host computer enclosure and which are powered by the host computer power supply. Each disk drive 20–26 is self contained, and it provides a predetermined amount of on-line mass storage. Once a cable has been selected via the interface 10, whether it connects to one of the drives 20-26 contained locally within the host computer cabinet, or is located in one of the external enclosures 12, 14, 16, the host computer communicates directly with the cable and either of its two drives until a particular data transfer dialog has been completed. The host computer may communicate to multiple disk drives via separate cables at the same time, so that a disk drive on one cable may be seeking to a cylinder, while another disk drive connected via another cable is actually transferring data to or from the host data bus. The supplied device driver, in conjunction with the host disk operating syste, keeps track of such multiple simultaneous disk drive operations.

One 3.5" diameter, micro-Winchester fixed disk drive described in co-pending U.S. patent application Ser. No. 07/192,353 filed on May 10, 1988, now U.S. Pat. No. 5,005,089, is especially preferred for use as each of the disk drives supported and connected by the interface of the present invention. That patent application is incorporated by reference herein.

The presently preferred micro-Winchester disk drives, as described in the referenced application, each provide 40 or 80 megabytes, or more, of on-line data storage with 64 kilobytes (eight blocks) of on-board disk cache memory. Each drive enables data to be sent to and received from the host computer as a block, rather than as a single byte value. An array of 32 of these fixed disk drives provides as much as approximatey 2.56 Gigabytes of on-line storage directly accessible to the host computer system.

Each drive has a bus-level interface which is modified for use herein by substitution of an "AT" interface chip in place of the SCSI interface chip 122 as described in the referenced application. The "AT" bus-level interface chip implements a set of registers and provides a state machine to enable AT disk drive task file execution, as explained above in connection with prior art fixed disk controller cards. Execution by the host CPU of fixed disk driver routines causes certain disk drive commands and values to be generated by the host, transferred to a selected disk drive via the I/O space and stored in the register set of the selected disk drive. These stored values are then decoded by the disk drive microprocessor and executed by the disk drive, with the reslt that data is received from the bus and recorded in storage locations specified by the operating system, or that data is read from and delivered to the host from stoage locations specified by the operating system. Host/disk data transfer operations are carried out as already explained above, with the drive setting an interrupt line sensed by the host and with the host then reading the status register of the drive, thereby initiating a block transfer and clearing the drive interrupt.

Returning to FIG. 2, the interface card 10 includes an AT interface 30 having a suitable edge connector pair 32 for making plug-in connections to the data lines (0-15), address lines (0-19) and control and status lines of the host computer I/O expansion slot. The control lines carry control signals from the host to the inteface including I/O Write, I/O Read, Host Address Latch Enable, and Host Reset. The rising edge of the I/O Write signal clocks data from the host data bus via the interface 10 and a selected cable into the selected disk drive. When low, the I/O Read signal enables data from the interface to be placed onto the host data bus; the rising edge latches the data from the interface at the host. The Host Reset line is active during the initial power on sequence, and whenever the host computer is reset. It causes each disk drive connected to the interface to enter its own reset routine.

Status lines carry control and status signals from the interface to the host including Host Interrupt Request (IRQ), and Host I/O 16. The Host IRQ line is used to signal an interrupt to the host computer when a drive is selected and the host has activated the —IEN bit in the digitla output register of the drive. Each disk drive connected within the subsystem connects to the host IRQ line. Thus, the host IRQ line may be set by any one of the disk drives and is reset to zero when the host has read the status register of the disk drive that set the interrupt or has written a command to the command register of that drive. The host learns the identity of the particular disk drive which has set the hsot IRQ line by virtue of reading interrupt status registers provided for each cluster, and it vectors its read of the drive's status register by virtue of a cable selection register provided for each cluster. Operation of the selection registers and the interrupt status regsiters is discussed in greater detail hereinafter.

The Host I/O 16 signal indicates to the host that the drive's 16 bit data register has been addressed and that the drive is preapred to send or receive a 16 bit data word.

A host data bus 34 passes through a bidirectional data bus buffer 36 to become a buffered host interface data bus 38 extending throughout the interface card 10 as shown in FIG. 2. Similarly, a host address bus 40 passes through a unidirectional bus buffer 42 to become a buffered interface address bus 44. A host control bus 46 passes through a buffer 48 to become a buffered control bus 50; and an interface status bus 52 passes through the buffer 48 to become a buffered host status bus 54.

The data bus 38 and address bus 40 lead directly to an external interface 56 which supports connection of the external enclosures 12, 14 and 16, and any additional enclosures, etc., via daisy chain connection provided by external cabling 62. A gated unidirectional control to cable buffer 58 buffers the control signals leading to each cluster including the external cluster enclosures 12, 14 and 16 at the interface 56 and the internal cluster comprising cable interfaces 80 and 88. The buffer 58 is controlled by the decode control circuit 68 which determines whether an access is to or from the local memory (BIOS ROM 64 or RAM 66), or whether it is to or from a selected drive within one of the clusters. A unidirectional status buffer 60 buffers status values from external clusters received at the interface onto the status bus 52. These values include IOCS16, IRQ and IOCHRDY. As already mentioned, when a drive sets its interrupt line, this event is broadcast over the IRQ status line leading to an interrupt handler at the host computer which thereupon points the CPU to a service routine for scanning each cluster interrupt status register in order to determine which drive has set its interrupt.

A read only memory 64, and a random access memory array 66 are addressed by the interface bus 44, and are connected to the interface data bus 38 through a emmory data driver 67. The memory data driver is unidirectional insofar as the read only memory 64 is concerned, and it is bidirectional with respect to the static random access memory 66.

A decode control circuit 68 includes comparison circuitry and an identifier field 69 which is hardwired in the case of the interface unit 10 and which may be a jumper field, or switch for each of the external units 12, 14, 16, etc. The control circuit 68 is connected to an interface selection register 70 and an interface interrupt status register 72. The decode control circuit 68 compares values written by the host computer into the selection register 70 with preestablished cluster/cable identifier values established by the identifier field 69 to determine if a correspondence exists. The comparison is preferably two-tiered. First the cluster number is comapred with the preestablished cluster identifier value. If a correspondence is determined to exist at the interface 10 or at an external enclosure 12, 14 or 16, between the incoming cluster-cable identifier and the preestablished cluster identifier value, the cable value portion is decoded, and then the bus drivers leading to the identified cable connecting the desired disk drive are gated on.

In the present subsystem, each drive has a unique identification number on the cable which is established by its installation at one of the two drive connections of the cable of the interface unit or external cluster enclosure and by an on-barod drive select jumper which specifies a maste drive (Drive 0) or slave drive (Drive 1) drive identifier back to the host. As will be recalled from the discussion hereinabove concerning the prior fixed disk controller, one interface byte register location (1F6) identifies drive and head. This byte value selects whetehr drive 0 or drive 1 is intended by the CPU. Thus, each cable may support two drives, and each of the two drives has a drive select jumper set to e.g. drive select 0 or drive select 1, for example. The drive compares the stored drive select bit position against its drive select jumper setting to ascertain if it is being addressed by the host, once the cluster/cable selection has been made.

The interface identifier field 69 is hard wired so that the drives operatively associated with the interface unit cables 80, 88 have defulat addresses ("cluster zero, cable zero, drive zero" for the first drive 20; "cluster zero, cable one, drive zero" for the third drive 24, etc.) The control circuit 68 is connected to the interrupt status register in order to enable that register to be polled by the host computer to determine if a particular disk drive requires attention of the host CPU.

A gated data buffer 74, gated address buffer 76 and gated control/status buffer 78 lead to a first drive cable 80 to which the drives 20 and 22 are connected. The cable 80 is logically identified as "cluster zero, cable zero". Similarly, a gated data buffer 82, gated address buffer 84 and gated control/status buffer 86 lead to a second drive cable 88 to which the drives 24 and 26 are connected. The cable 88 is logically identified as "cluster zero, cable one".

Each external cluster has its own selection register, interrupt request regsiter and decode control circuit. Each decode control circuit includes a jumper field which logically identifies the external enclosure 12, 14, 16, or as the case may be.

External enclosure 12, which is logically identified as enclosure/cluster one, includes up to eight cables each supporting two disk drives. While sixteen disk drives are supported by each cluster, four disk drives connected via tow cables are shown in FIG. 1 for each external enclosure. Each drive is identified by cluster number, cable number and drive number, i.e., cluster one, cable zero, drive zero; cluster one, cable zero, drive one; cluster one, cable one, drive zero; and cluster one, cable one, drive one, and so forth. Each of the other external enlcosures 14, 16, etc., has the same drive connection arrangement and logical identification.

In accordance with an aspect of the present invention, one additional address location in the I/O space is used for writing cluster/cable selection information to the subsystem and for reading interrupt status of each disk drive. For example, a byte addressed at 1F8 by the host CPU enables the host CPU to braodcast a cluster/cable selection value to the selection register 70 at the interface unit 10 and to the selection register at each of the external enclosures. Bits 0-2 are used to identify a paticular one of eight cables within a cluster. Bits 3-5 are used to identify a particular one of eight clusters. Bit 6 is presently reseved. Bit 7 is used to select and enable writes to the static RAM 66 in lieu of a particular cluster/cable, thereby preventing spurious writes to the RAM 66. Bits 8-15 are presently reserved, but may be used to identify banks of clusters, etc.

The new byte enables the host CPU to select a particular one of the cables so that a drive pair may occupy the conventional disk drive logical input/output space of the computing system at a particular time. Each selection register is an eight bit register that stores cable and enclosure information sent by the host computer. (A sixteen bit register may be employed as the selection register and thereby enable one of up to 131,070 drives to be selected, should so great a number of disk drives be desired by the user).

Each selection register is a write-only register located at a valid logical I/O address, preferably contiguous with the existing disk drive input/output space, e.g. 1F8 (Hex) when the address space beings at 1F0. The actual address for the selection register is decoded by the decode control circuit 68 from the address bus 44. The selection regsiter 70 is written by the host with an eight bit value indicating the precise identity of the disk drive cable to be selected for a disk drive read or write operation. The value stored in the selection register 70 is then compared to a value established by the identification field 69 by the control circuit 68. A parity (called a "hit") indicates that the drive cable of inerest is located at that particular cluster. A hit also enables the appropriate bus drivers leading to the selected cable supporting the disk drive of interest to the host CPU. Thus, at any given moment, only one cluster and one cable is in direct electrical connection to the host computer.

Each interrupt status regsiter including the status regsiter 72 of the interface 10 and the interrupt status regsiter at each external cluster) is e.g. an eight bit register containing the drive interrupt status information for all cable supported within the particular cluster/enclosure. The eight bit register is actually read as if it were a sixteen bit register, so that odd clusters are read as the high byte and even clusters are read as the low byt eof the interrupt status word. This arrangement provides greater speed to host CPU-subsystem communications.

Each bit position of the status register denotes a separate calbe, so that if a disk drive sets its interrupt line, the bit position for the cable connecting to that particular drive will also be set. When a bit position of one of the interrupt status registers is set to a logical high value, this signals the host CPU that a drive connected to the cable corresponding to that bit position desires attention from the host CPU.

Each interrupt status register is sequentially scanned, and is accessible only during a read operation addressed to a valid logical I/O address, such as 1F8, as decoded by the decode circuit 68. Each interrupt status register is read sequentially for each cluster/enclosure, with the reading operation stopping whenever a drive interrupt is detected. Once an interrupt is located at a particular bit position of a particular interrupt status register, the host computer begins to service the drive connected to the cable pointed to by the interrupt in conventional fashion. Reading of the interrupt status registers is multiplexed in pairs, with even enclosure numbers e.g. 0, 2, 4, 6, etc., being read as the lower order byte and with odd enclosure numbers e.g. 1, 3, 5, 7, etc., being read as the higher order byte of the sixteen bit data word on the data bus 38.

A control line REG_OP extends to the control circuit 68 of each cluster and is used with I/O Write or I/O Read commands to the cluster of the interface unit 10 and to each cluster within each of the external enclosures 12, 14, 16, etc. During I/O Write, the REG_OP line causes the current valu eon the data bus to be broadcast to and written in every selection register including the selection register 70 at the interface unit 10 and to each selection register of each external enclosure. During I/O Read, the REG_OP line causes the value contained within a selected interrupt status register to be written onto the data bus in order to be made available to the host CPU.

The optional BIOS ROM 64 contains up to seven kilobytes or more of host executable device driver routines which are tailored for use with the interface 10 and external enclosures. These bytes may be addressed directly by the host CPU at C8000, CA000, CC000, or CE000, as established by a jumper field at the decode control circuit 68. Only a portion of the selected eight kilobyte address space, such as the first seven kilobytes, is used to address the BIOS ROM 64, the remaining address space being available to address the random access memroy 66.

The BIOS ROM 64 includes scan routines which scan all of the resources connected and available within he expansible subsystem during power on reset and whenever a host system reset occurs. The capacities and locations of available drives are recorded in a resource table of the random access memory 66 as a reuslt of these initialization scans, and are thereupon available to the operating system and BIOS driver routines. Thus, disk drives and enclosures may be added to the subsystem and used by the host computer without any need for modification of the operating system, other than an automatic update of available fixed disk resources, occurring at a system reset.

The random access memory 66 enables on-line drive resrouce and configuration values to be stored dyanmically, and it also provides scratch pad space for power-on diagnostic checks. As mentioned above, initial drive resource and configuration values are established by resource scan routines stored in the BIOS memory 64 which are executed by the host CPU. The random access memory 66 is addressed in the upper portion of the address space set by the jumper which sets the address space for the BIOS RAM 64, as already mentioned above.

In order to support an extended length for the interconnection cabling 62 between the external interface units, thereby to provide greater immunity to noise and cross talk, each signal line is paired as one line of a twisted pair, the other line thereof being a ground referenc eline. The interconnection cabling 62 includes 68 conductors, only 34 of which actually are availble to carry signals. This arrangement has been found to be particularly effective for disk drive ribbon able lengths beyond several feet.

Figure 3:
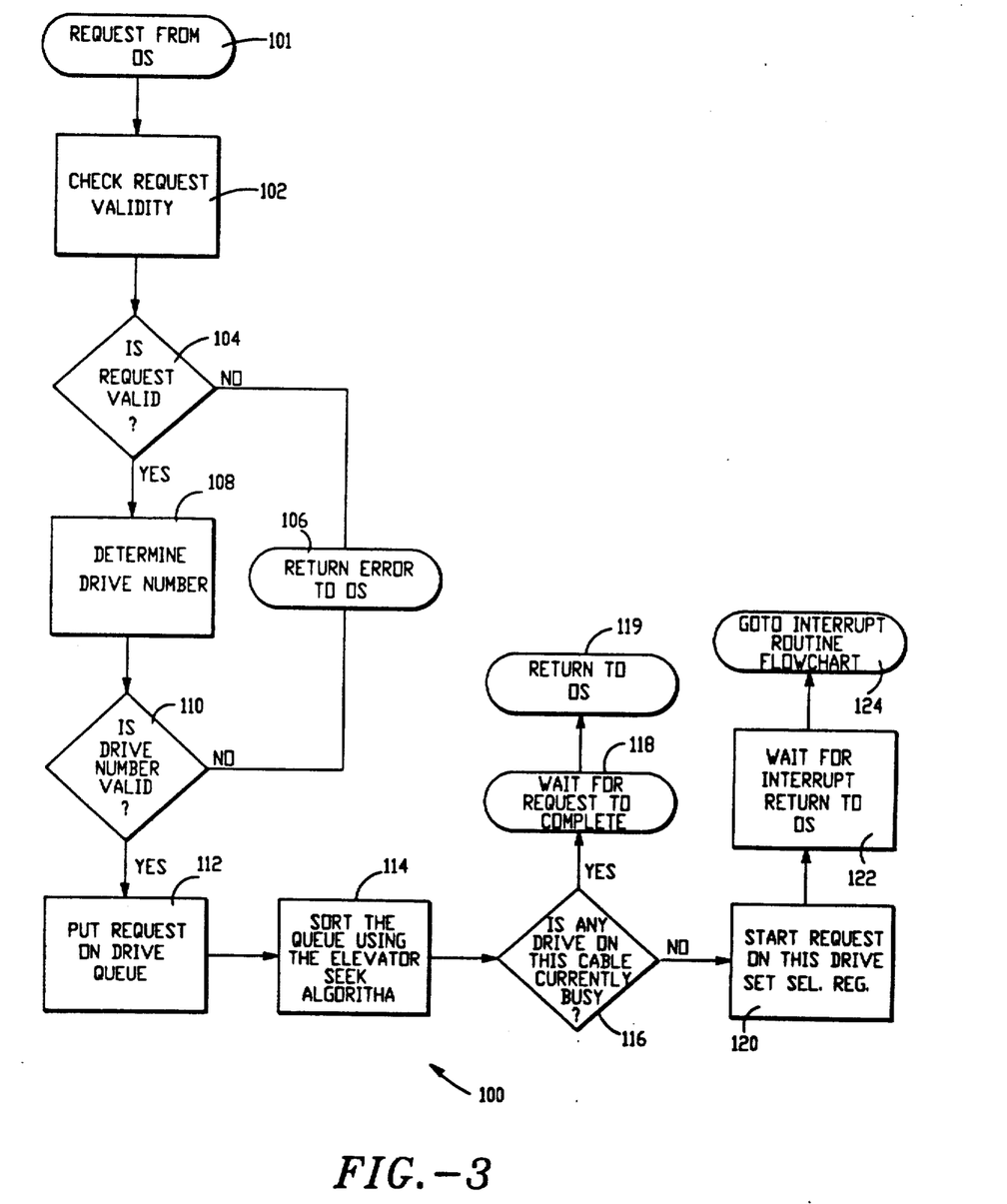
FIG. 3 is a flowchart illustrating a routine for processing a service request from the host operating system.

FIg. 3 sets forth a flow chart illustrating a cluster disk drive subsysstem sevice request routine 100 which is called bgy the host computer operating system. This device drive routine is directly executed by the host computer. When a service request is received from the operating system, the FIG. 2 routine 100 is entered at an entry node 101. The validity of the request is checked by the device driver at a node 102 in order to determine that the request is one that is appropriate to and can be handled by the cluster disk subsystem.

Appropriate action is taken at a logical branch 104. If the request is determined to be invalid, an error code is returned to the operating system at a step 106. If the request is valid, the drive number is determined at a step 108.

If the decoded drive number points to a drive which is not actually attached to the cluster disk subsystem, the driver number is thus determined to be invalid at a logical node 110, and an error is returned to the operating system at the error message node 106.

Each drive has its own task queue maintained for it by the device driver. If the drive number is valid, indicating that that drive is available on the cluster disk subysstem, the request is placed on that drive'queue at a step 112. At a step 114, the drive queue is then sorted in accordance with an elevator seek algorithm which arranges tasks within the queue to be carried out as the disk drive actuator sweeps e.g. from an outer cylinder region to an inner region and back (elevator-like actuator action). This algorithm thereby reduces data access times and increases data throughput of each disk drive.

A logical node 116 then determines whether either of the drives on the selected cable is busy at the present time. Only one request can be handled at a tiem for a particular cable. If the other drive on the cable is presently executing a request, a wait path 118 is entered which causes control to be returned to the oeprating system at a step 119. This path 118 allows the operating system to resume performance of other tasks awaiting host CPU attention while the other disk drive on the selected cable is still active in completing its service request.

Since the present request remains in the drive queue, the device driver knows that it is a request that must be executed. When the other drive's request on the selected cable has finished, an interrupt service routine will initiate the request to the selected drive. The service request is then started on the selected cluster and cable at a step 120. This step 120 causes the actual physical path to be set up between the host computer and the selected cable via the selection registers. Once the request is started, control is returned to the operating system at a node 122, and the operating system is free to perform other tasks while it waits for the selected disk drive to generate an interrupt, thereby indicating to the host that the connection path has been successfully established.

Any drive included within the cluster disk subsystem which requires CPU attention will assert its interrupt line. This signal is collected at the cluster and is used to set a bit position corresponding to the drive's cable in its cluster's interrupt status register. At the same time, a subsystem interrupt signal propagates to the host CPU via the IRQ14 line and interrupt handler of the host computer.

Figure 4A:
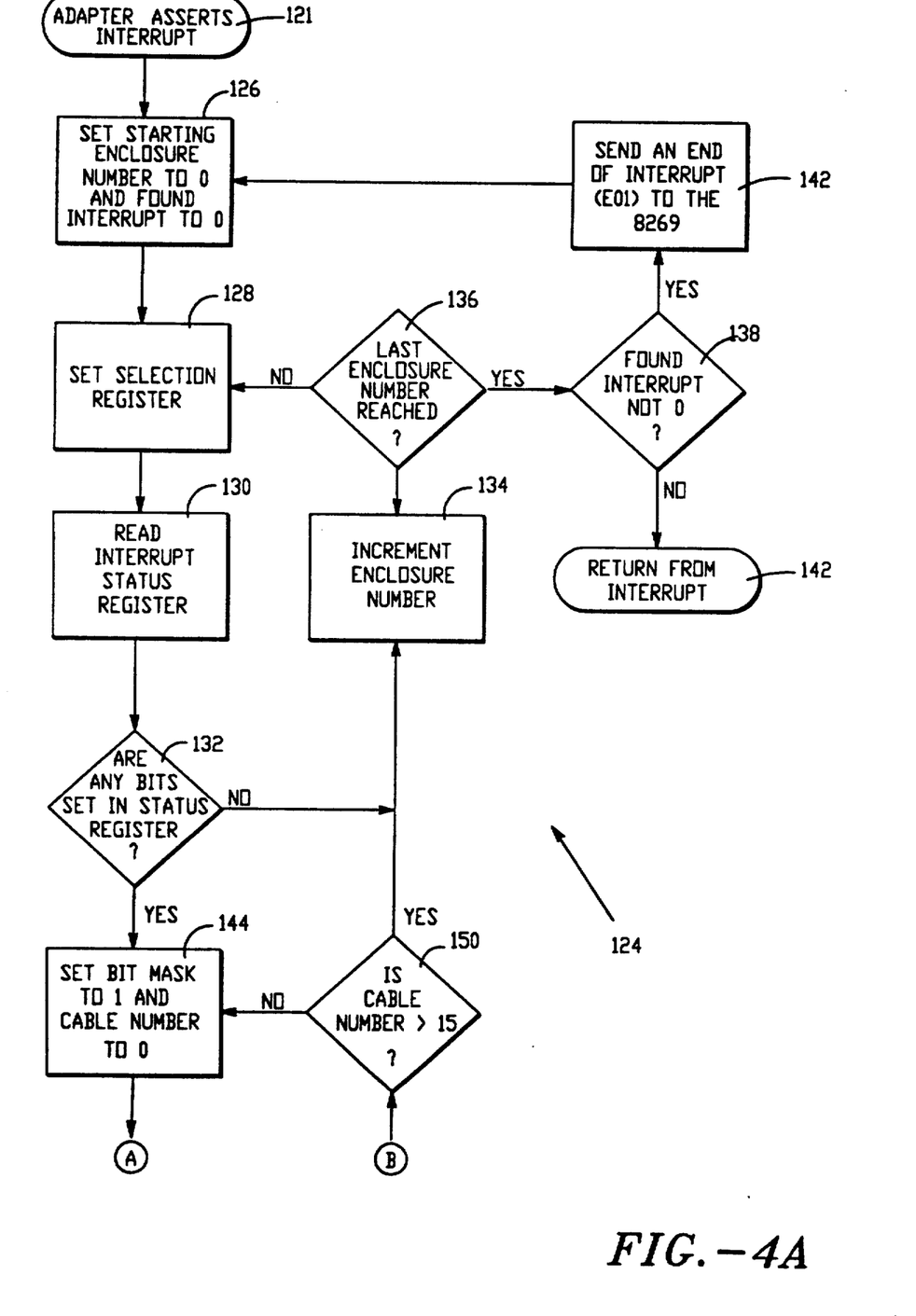
FIGS. 4A and 4B are two sheets forming a single flow chart of the interface interrupt service routines.
Figure 4B:
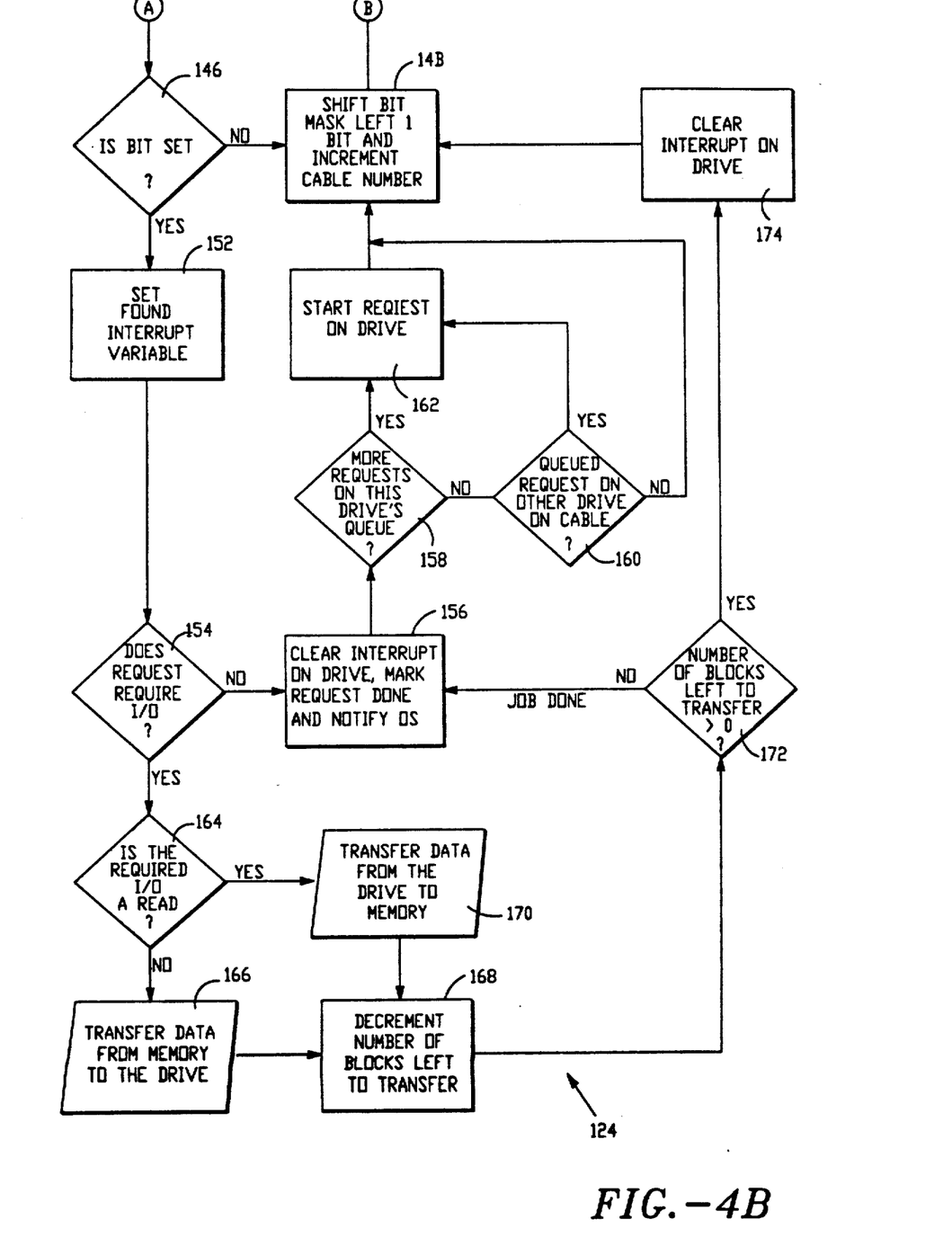

Once an interrupt from the selected disk drive is received at the host in response to the path establishment step 120, an interrupt service routien 124 is executed. FIGS. 4A and 4B together provide a flowchart of the interrupt service routine 124 which is executed by the host CPU.

The interrupt service routine 124 includes two variables: "enclosure numer", and "found interrupt". The service routine begins by settinb toh the enclosure number variable and the found-interrupt variable to zero at a step 126. The selection register value is broadcast to all selection registers at a step 128.

A quick check of the interrupt status registers is made at a step 130, to see if any bit positions are non-zero. If no interrupt status bits are found to be set (non-zero) for a particular cluster pair at a logical node 132, the cluster/enclosure register value is incremented by one at a step 134, and checked to see if it is the last enclosure number at a node 136. If the cluster/enclosure number is not the last one, a return is made to the step 128, and the next enclosure is quickly checked at the step 130.

If the last enclosure number has been checked, and the found interrupt variable is not zero, as tested at a logical node 138, an end of interrupt signal is generated and sent to the host interrupt handler to clear the disk subsystem interrupt, and a return is made to the node 136 of the interrupt service routine.

If, after the last enclosure/cluster number has been reached, if an interrupt has been found, the host system interrupt handler or latch is reset at a node 140, and the interrupt service routine 124 is repeated by a return to the node 126. This procedure prevents a situation where the system might lose an interrupt from anotehr drive, during the time interval when the presently selected disk drive being serviced by the interrupt service routine has had its interrupt line finally cleared. Only if the found interrupt variable is still zero at the end of a subsequent check of all clusters, as again tested at the node 138, will a return be made to the operating system at node 142. This repetition through the interrupt service routine 124 positively establishes that no disk drive cable within the subysstem remains with an interrupt bit set.

Usually, at least one interrupt status bit is found to be set during the reading of interrupt status registers as determined at a logical node 132. When one of the interrupt status registers does not include all zero bits, it is necessary to determine which bit position is set. In order to check each bit position of the status registers, a bit mask is set to one (meaning that the lowest digit position of the interrupt status registers is inspected) and the cable number is set to zero, at a step 144.

Continuing on FIG. 4B, a logical node 146 determines whether the lowest order bit of the interrupt status regsiter is set. If not, the bit mask is shifted left one bit position and the logical cable number is incremented by one at a step 148. A logical node 150 (FIG. 4A) determines if the logical cable number is greater than the maximum number of interface drive cables supported by the particular enclosure/cluster e.g. greater than 15. If not, a return is made to the step 144, and the loop is repeated until all 16 cable bit positions have been checked. When all 16 positions have been checked, a return is made to the step 134, and the next cluster/enclosure is checked.

Once a particular bit position is found having a bit set, as determined at the logical node 146 (FIG. 4B), the found-interrupt variable is set to a non-zero value at a step 152 to indicate that at least one interrupt has been found. At this point, the found-interrupt variable is not zero. A logical node 154 then determines if the service request requires a data input/output operation at the target disk drive. If not, the interrupt is cleared at the presently selected disk drive, the request is marked done, and the operating system is so informed of this fact by a step 156.

If there are not more additional service requests waiting on this particular drive's request queue, as determined at a logical node 158, a logical node 160 determines if there are any queued service requests for the other drive on the selected cable. If so, a service request is started on the selected drive at a step 162, and the interurpt routine returns to the step 148. If not, ar eturn is made directly to the step 148. If there are additional service requests waiting on this particular drive's request queue, they are serviced at the step 162.

If the service request requires a data input or data output operation (read or write), as determined at the logical node 154, a logical node 156 determines whether a read or a write is specified. If a write is specified, a block fo data is transferred from a memory location of the host computer to the selected drive at a step 166, and the data block counter is decremented at a step 168. Every time that a block of data has been successfully written to or read from a storage surface by the presently selected disk drive, the drive sets and puts out its drive interrupt signal.

A logical node 172 determines whether the number of blocks left to transfer is greater than zero. if not, the interrupt bit for the particular drive, marking the end of the last block transfer, is cleared, the service request is marked done and the operating system is informed of this fact at the step 156. If more blocks remain to be transferred, a step 174 clears the drive interrupt and returns to the step 148. This part of the interupt service routine keeps track of how many blocks are left to transfer, in order ultimately to satisfy the current operating system request.

It will be appreciated by those skilled in the art that the present invention has been realized in providing an expandable fixed disk drive data storage subsystem for use with at a single drive input/output location of a host computing system. The subsystem of the present invention enables a vast increase in the amount of practical on-line data storage for the host computing system without adding any substantial software overhead to the operating system. For example, instead of a single large capacity fixed disk drive providing e.g. 320 MBytes of on-line storage to a host computer, the present subsystem 5 with four 80 MByte drives enables a family data base programs to be on a first drive, the data base files themselves to be on the second drive, word processing and E-mail applications to run on the third drive, and a computer aided design application to be on the fourth drive. Each drive canb e carrying out is data storage and retrieval activities asyncrhonously with respect to the othe drives and with greater overall data throughput in a multi-tasking, multiuser environment. Also, the expansible subsystem 5 provides a redundant, highly fault tolerant data store, in that if a single disk drive of the array fails in service, all other drives remain functional and available to the host. If an enclosure fails, all other enclosures remain fully operational. Data mirroring at paired drives may also be provided by the operating system by calling for sequential data block writes, should mirrored data storage be desired for disk fault tolerance and computing system overall redundancy.

Having thus described an embodjiment of the invention, it will now be appreciated that the objects of the invention have been fully achieved in realizing an expansible disk drive interface for a computer system, and it will be understood by those skilled in the art that many changes in construction and widely differing embodiments and applications of the invention will suggest themselves without departing from the spirit and scope of the invention. The disclosures and description herein are purely illustrative and are not intended to be in any sense limiting.

We claim:

1. An expansible fixed disk drive data storage subsystem for attachment of multiple bus-level interface fixed disk drives to input/output address, data and control buses of a host computer at a single bus-level interface input/output logical address space, each of said disk drives including an internal disk drive controller, the expansible subsystem comprising:
   interface means including bus connector means for establishing electrical connection to the input/output address, data and control buses of the host computer and further including cluster bus means for interconnecting the bus connector means to at least one of an expansible plurality of disk drive cluster means;
   each of said cluster means comprising:
   plural disk drive cable means, each of said cable means for providing direct host bus electrical connection to at least oen of said multiple bus-level interface fixed disk drives at said isngle bus-level interface input/output logical address space,
   gated data, address and control/status buffer means for selectively electrically connecting one of said cable means to the cluster bus means in response to a gate control signal,
   cluster and cable selection register means connected to the cluster bus means for receiving and storing a cluster and cable selctionv alue sent by the host computer via said bus connector means and connected to said gated data, address and control/status buffer means for generating said gate control signal to said gated data address and control/status buffer means in accordance with said cluster and cable selection value for selecting one of said cable means, and
   disk drive interrupt status regsiter means connected to the cluster bus means for holding an interrupt signal for interrupting the host computer and connected to said plural disk drive cable means for receiving the interrupt signal sent by one of said disk drives, the interrupt signal for identifying to the host computer said cable means fo the one disk drive sending the interrupt signal.

2. The expansible fixed disk drive data storage subsystem set forth in claim 1 wherein said cluster and cable selection regsiter means comprises a write-only register connected to the cluster bus means for storing said cluster and cable selection value, an identifier field means for storing unique identifiers each identifying a respective one of said disk drive cable means, and comparison means connected to the write only register and to the identifier field means for comapring said cluster and cable selection value with the unique identifiers to determine a correspondence and thereupon for generating the gate control signal to control the gated data, address and control/status buffer means.

3. The expansible fixed disk drive data storage subsystem set forth in claim 1 wherein said interface means comprises BIOS read only memory means connected to the bus connector means via a memory data driver means, the BIOS read only memory means containing subsystem driver routines which are accessed and executed by a central processing unit of the host computer.

4. The expansible fixed disk drive data storage subsystem set forth in claim 1 wherein said interface means comprises random access memory means connected to the interface means via a memory data drive means, the random acces memroy means being directly accessed by a central processing unit of the host computer for recording dynamic subsystem configuration values during operation of the subsystem.

5. The expansible fixed disk drive data storage subsystem set forth in cliam 1 wherein a first one of the cluster means is installed within a cabnet means that encloses the host computer.

6. The expansible fixed disk drive data storage subsystem set forth in claim 5 wherein said cluster bus means includes an internal cluster bus means for connecting the first one of said cluster means, and further includes external cluster bus means and external cluster bus interface means for connecting the external cluster bus means to the internal cluster bus means.

7. The expansible fixed disk drive data storage subsystem set forth in clim 6 wherein cluster means include at least one external cluster means connected to the external cluster bus means, each of said at least one external cluster means being enclosed within an external housing with at least one of said disk drives and power supply means for supplying power to said at least one of said disk drives enclosed within the external housing.

8. The expansible fixed disk drive data storage subsystem set forth in claim 7 wherein the external cluster bus means comprises a cable wherein each of a plurality of signal lines of the cable is physically formed into a twisted pair with a ground line.

* * * * *